(12) United States Patent
Tatsumi et al.

(10) Patent No.: US 10,333,110 B2
(45) Date of Patent: Jun. 25, 2019

(54) BATTERY MODULE AND METHOD FOR MANUFACTURING THE SAME

(71) Applicant: TOYODA GOSEI CO., LTD., Kiyosu-shi, Aichi (JP)

(72) Inventors: Yoshiaki Tatsumi, Kiyosu (JP); Kosuke Kusaba, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 624 days.

(21) Appl. No.: 14/911,815

(22) PCT Filed: Dec. 26, 2014

(86) PCT No.: PCT/JP2014/006489
§ 371 (c)(1),
(2) Date: Feb. 12, 2016

(87) PCT Pub. No.: WO2015/145517
PCT Pub. Date: Oct. 1, 2015

(65) Prior Publication Data
US 2016/0197315 A1 Jul. 7, 2016

(30) Foreign Application Priority Data

Mar. 27, 2014 (JP) ................................ 2014-065893

(51) Int. Cl.
*H01M 2/02* (2006.01)
*H01M 2/10* (2006.01)
(Continued)

(52) U.S. Cl.
CPC ............. *H01M 2/024* (2013.01); *H01M 2/08* (2013.01); *H01M 2/1077* (2013.01); *H01M 2/02* (2013.01);
(Continued)

(58) Field of Classification Search
None
See application file for complete search history.

(56) References Cited

U.S. PATENT DOCUMENTS 3,415,715 A * 12/1968 Van Gorcom ......... B32B 15/08
428/423.3
5,701,028 A * 12/1997 Waki ................ H01L 23/49524
257/666
(Continued)

FOREIGN PATENT DOCUMENTS

JP 2003-207087 A 7/2003
JP 2012-234699 A 11/2012
(Continued)

OTHER PUBLICATIONS

International Search Report of the International Searching Authority dated Sep. Mar. 24, 2015 for the corresponding international application No. PCT/JP2014/006489.
(Continued)

*Primary Examiner* — Jeremiah R Smith
(74) *Attorney, Agent, or Firm* — Posz Law Group, PLC

(57) ABSTRACT

A technique for sufficiently filling an adhesive between a battery retaining section of a holder and a battery cell in a battery module configured by the battery cell being inserted and adhered in the aperture-shaped battery retaining section provided in the holder is provided. An adhesive layer that adheres a holder and a battery cells in a battery module is formed in a two-layer structure of a holder-side adhesive layer making contact with an inner circumferential surfaces of a battery retaining sections and a cell-side adhesive layer making contact with an outer circumferential surfaces of the battery cells, and different types of adhesives are used for an adhesive configuring the holder-side adhesive layer and an adhesive configuring the cell-side adhesive layer.

12 Claims, 6 Drawing Sheets

(51) Int. Cl.
 *H01M 2/08* (2006.01)
 *H01M 2/20* (2006.01)
(52) U.S. Cl.
 CPC ............ *H01M 2/105* (2013.01); *H01M 2/206* (2013.01); *H01M 2220/20* (2013.01)

(56) References Cited

U.S. PATENT DOCUMENTS

| | | | |
|---|---|---|---|
| 6,455,354 B1* | 9/2002 | Jiang ...................... H01L 23/13 | 257/783 |
| 2005/0214648 A1* | 9/2005 | Boulton .............. H01M 2/0257 | 429/234 |
| 2009/0023060 A1* | 1/2009 | Villanueva ............ H01M 2/105 | 429/156 |
| 2011/0214808 A1* | 9/2011 | Hermann ................ H01M 2/08 | 156/275.5 |
| 2012/0015227 A1* | 1/2012 | Hwang ............... H01M 2/1022 | 429/99 |
| 2012/0082887 A1* | 4/2012 | Ninomiya ................ H01G 9/08 | 429/159 |
| 2012/0156543 A1* | 6/2012 | Cicero .................. H01M 2/024 | 429/120 |
| 2012/0308873 A1* | 12/2012 | Sekino ................ H01M 2/1016 | 429/156 |
| 2013/0143103 A1* | 6/2013 | Huang ................ H01M 2/1077 | 429/159 |
| 2013/0236759 A1 | 9/2013 | Kusaba et al. | |
| 2014/0091496 A1* | 4/2014 | Carnahan ............. B29C 70/443 | 264/261 |
| 2014/0370221 A1* | 12/2014 | Chen ........................ C09J 11/02 | 428/40.2 |
| 2014/0370354 A1* | 12/2014 | Yang ................... H01M 10/625 | 429/120 |
| 2015/0037639 A1* | 2/2015 | Takamura ............... H01M 2/08 | 429/94 |
| 2015/0096680 A1* | 4/2015 | Zhao ......................... C09J 7/50 | 156/330 |
| 2015/0111010 A1* | 4/2015 | Nash ...................... C09J 7/0203 | 428/200 |
| 2015/0147638 A1* | 5/2015 | Tamura ............... H01M 2/0277 | 429/179 |
| 2015/0188203 A1* | 7/2015 | Enomoto .......... H01M 10/6568 | 429/83 |
| 2015/0207114 A1* | 7/2015 | Khakhalev ............. H01G 11/78 | 429/163 |
| 2015/0301369 A1* | 10/2015 | Wang ........................ C09J 5/04 | 428/414 |
| 2015/0372263 A1* | 12/2015 | Douke ................ H01M 2/0275 | 429/176 |
| 2016/0006007 A1* | 1/2016 | Takasaki ............. H01M 2/0277 | 429/99 |

FOREIGN PATENT DOCUMENTS

| | | |
|---|---|---|
| JP | 2013-008655 A | 1/2013 |
| JP | 2013-187119 A | 9/2013 |

OTHER PUBLICATIONS

Written of the International Searching Authority dated Sep. Mar. 24, 2015 for the corresponding international application No. PCT/JP2014/006489.

* cited by examiner

[Fig. 1]
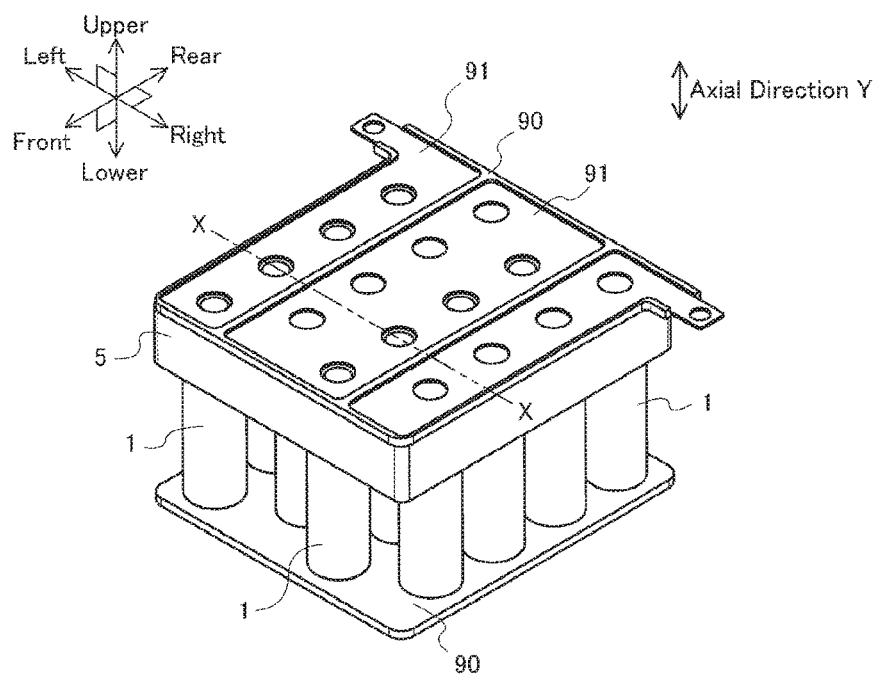

[Fig. 2]
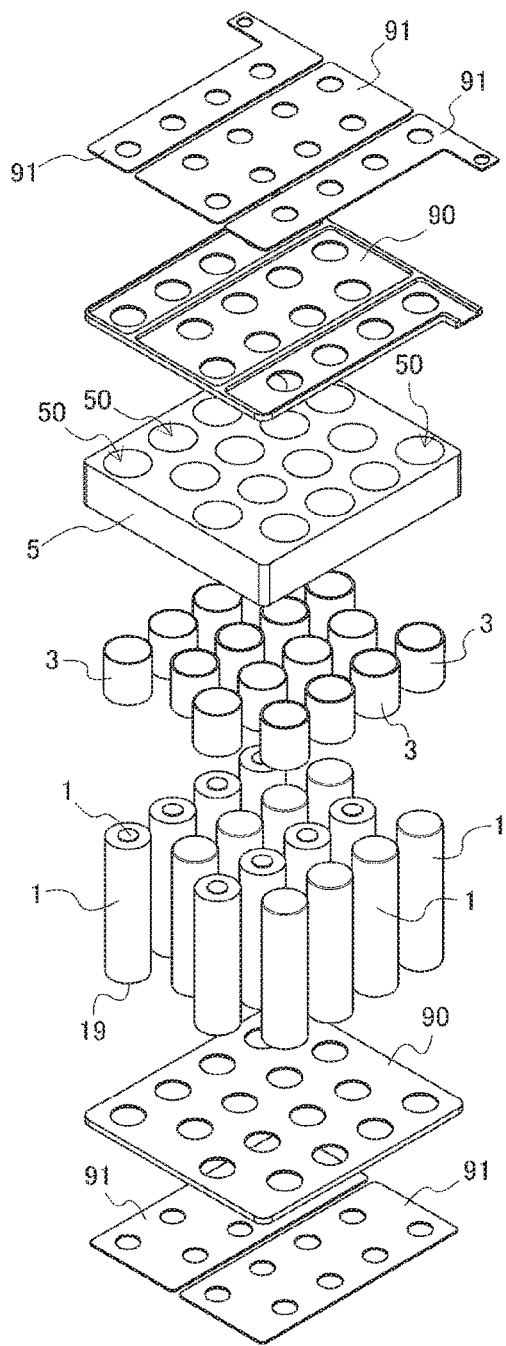

[Fig. 3]
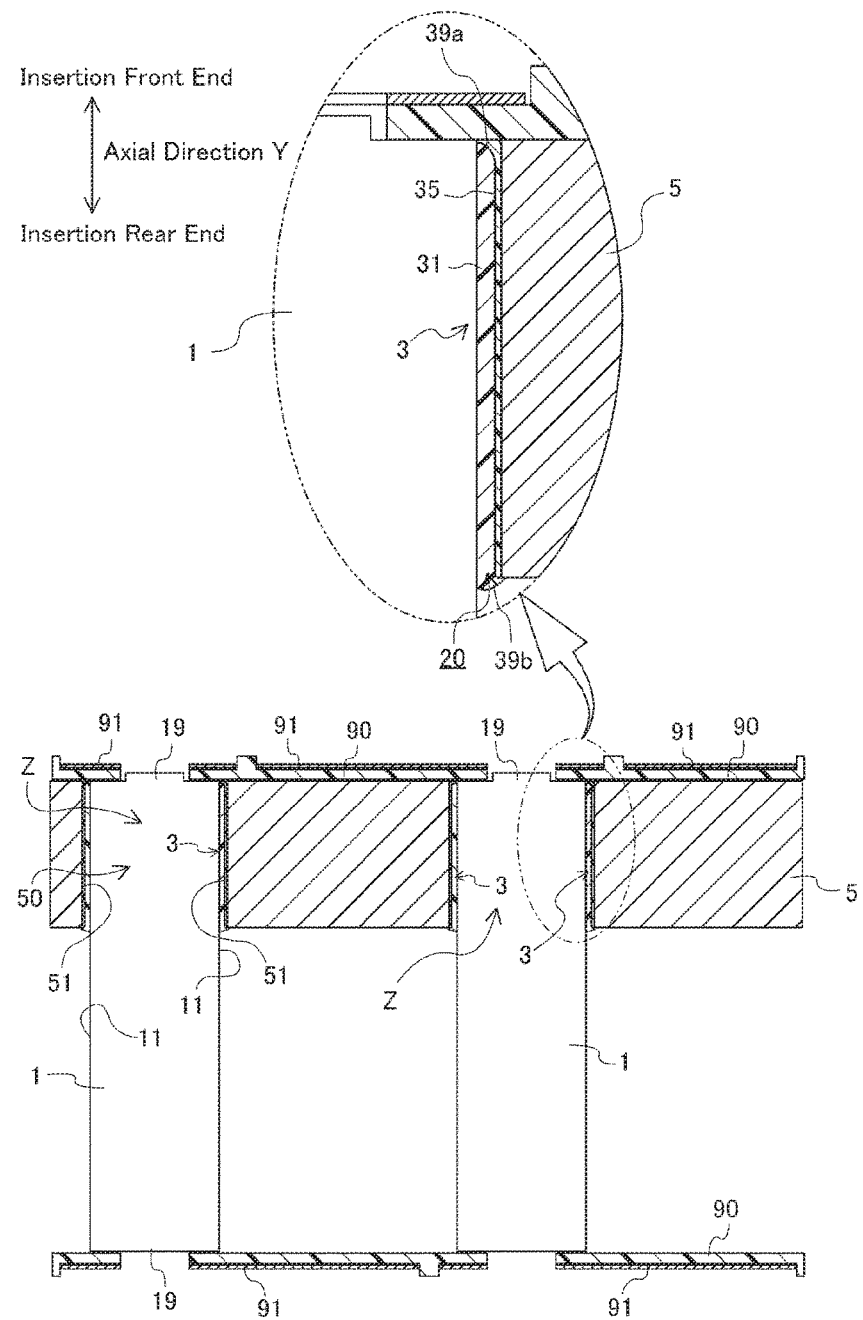

[Fig. 4]
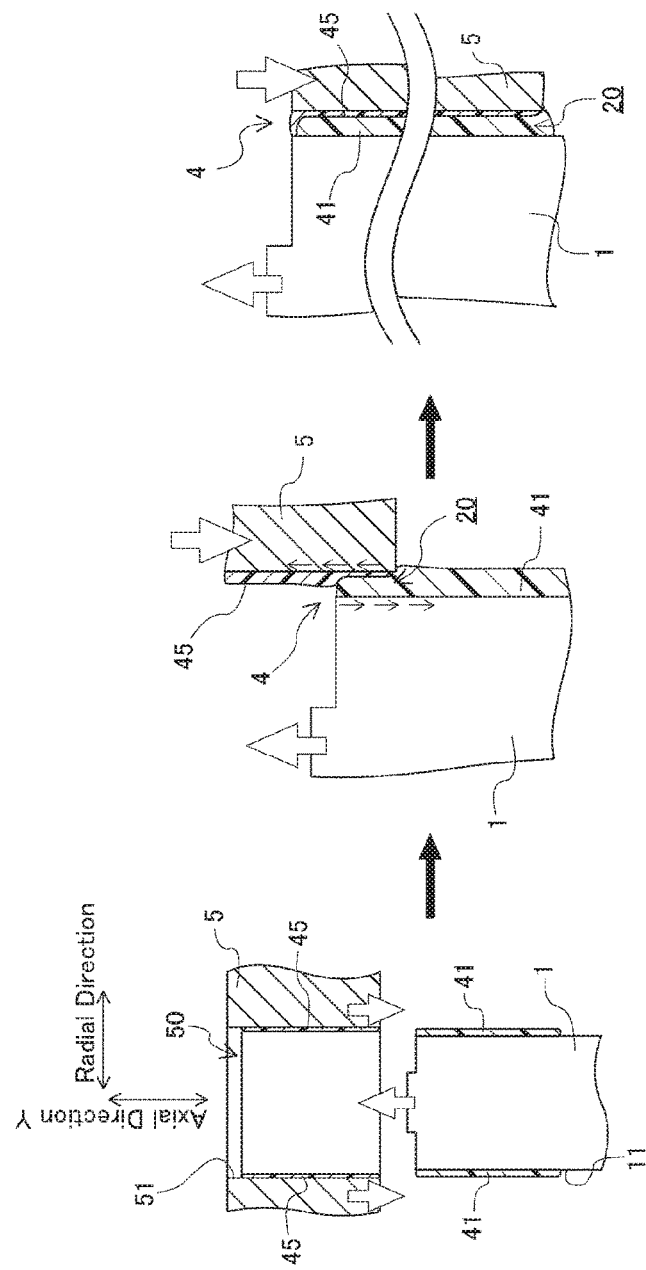

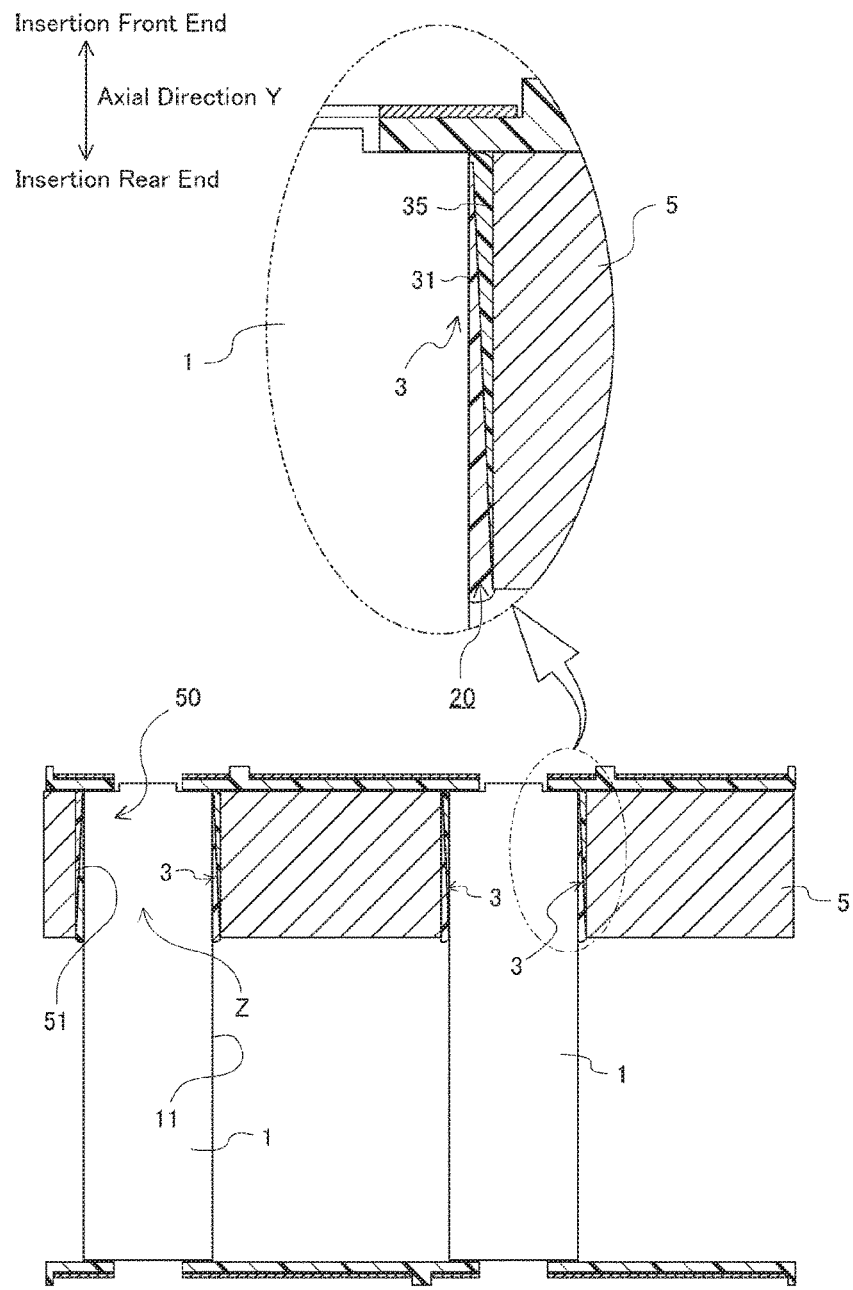

[Fig. 6]
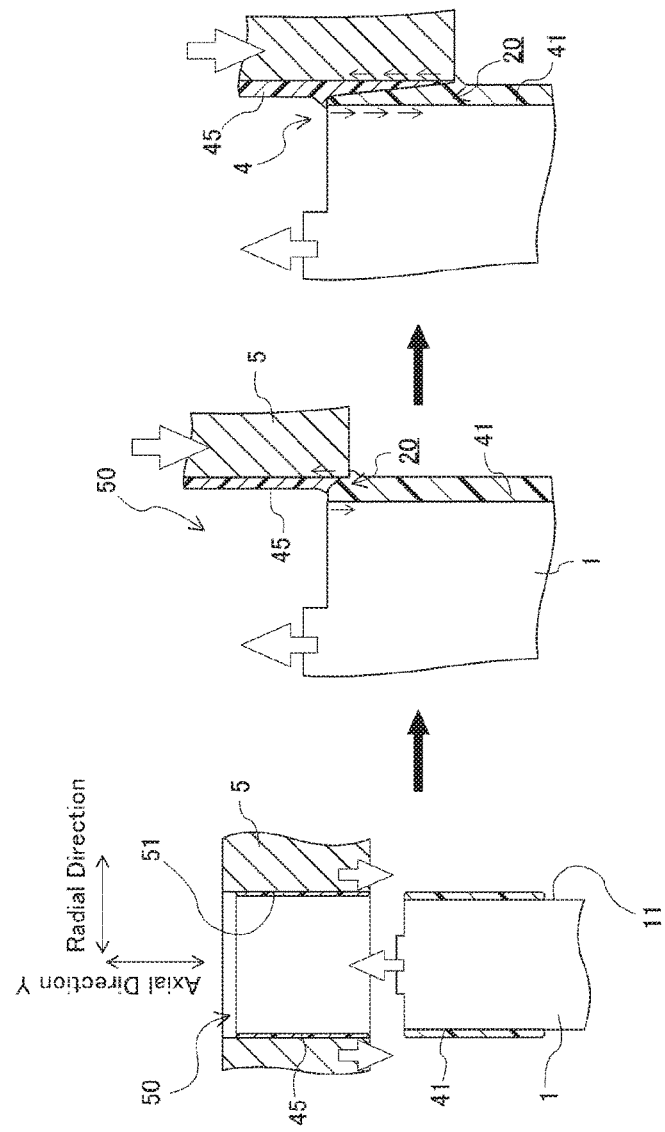

BATTERY MODULE AND METHOD FOR MANUFACTURING THE SAME

CROSS REFERENCE TO RELATED APPLICATIONS

This application is a U.S. national stage application of PCT/JP2014/006489 filed on Dec. 26, 2014, which claims priority to Japanese Patent Application No. 2014-065893 filed on Mar. 27, 2014, the contents of which are incorporated herein by reference.

TECHNICAL FIELD

The invention relates to a battery module including a battery cell and a holder for retaining the battery cell, and a method for manufacturing the battery module.

BACKGROUND ART

A battery cell in a battery module is generally adhered onto a holder. For example, a battery module introduced in Patent literature 1 integrally adheres a plurality of battery cells to a holder. This type of battery module is also called a battery pack, and is used for various purposes such as a battery for a vehicle, or the like.

In the battery module introduced in Patent literature 1, a battery retaining section forming an aperture shape is provided in the holder, and the battery cells are inserted in this battery retaining section. Further, an adhesive is injected between an inner circumferential surface of the battery retaining section of the holder and outer circumferential surface of the battery cell, and the adhesive is solidified to form an adhesive layer. However, according to a method for injecting the adhesive between the inner circumferential surface of the battery retaining section and the outer circumferential surfaces of the battery cells (so-called potting method), the injection and solidification of the adhesive takes time, and work efficiency thereof is inferior.

To improve the work efficiency, for example, a method may be assumed in which the adhesive is coated to the outer circumferential surfaces of the battery cells, and the battery cells in a state in which the adhesive has been coated are inserted into the battery retaining section.

Meanwhile, to stably retain a battery cell on a holder, it is assumed that a gap between an inner circumferential surface of a battery retaining section provided in the holder and an outer circumferential surface of the battery cell is preferably kept small. In this case, operators have to fill a narrow gap with the adhesive. However, since the adhesive has a relatively high viscosity, a friction resistance with the inner circumferential surface of the battery retaining section is relatively large, whereby a uniform coating is difficult. Due to this, it had not been easy to uniformly spread the adhesive in the narrow gap between the inner circumferential surface of the battery retaining section and the outer circumferential surface of the battery cell. Further, when the adhesive is not sufficiently spread in the gap between the inner circumferential surface of the battery retaining section and the outer circumferential surface of the battery cell, and air is caught inside an adhesive layer, there has been a possibility that an adhering area of the adhesive and its counterpart member (that is, the inner circumferential surface of the battery retaining section and/or the outer circumferential surface of the battery cell) is reduced, or strength of an adhering layer formed of the adhesive layer is reduced. Due to this, there has been a problem that the adhering strength is difficult to improve, and the battery cell cannot be stably adhered integrally to the holder.

CITATION LIST

Patent Literature

PTL 1: JP2013-8655 A

SUMMARY OF INVENTION

Technical Problem

The invention has been made in view of the above circumstance, and aims to provide a battery module in which an adhesive is sufficiently filled between a battery retaining section of a holder and a battery cell, and a method for manufacturing the battery module.

Solution to Problem

A method for manufacturing a battery module of the invention that solves the above problem is a method including:

an inserting step of inserting a battery cell in a battery retaining section of a holder that includes the aperture-shaped battery retaining section, and provides an adhesive between an inner circumferential surface of the battery retaining section of the holder and an outer circumferential surface of the battery cell; and a cell fixing step of fixing the inner circumferential surface of the battery retaining section and the outer circumferential surface of the battery cell by the adhesive, wherein in the inserting step, an adhesive layer that is formed of the adhesive and provided between the inner circumferential surface of the battery retaining section and the outer circumferential surface of the battery cell on an entire circumference of the battery cell in a circumferential direction at least in a part of a region of the battery cell in an axial direction is formed, the adhesive layer has a layer structure including a holder-side adhesive layer that makes contact with the inner circumferential surface of the battery retaining section and a cell-side adhesive layer that makes contact with the outer circumferential surface of the battery cell, and different types of adhesives are used as the adhesive configuring the holder-side adhesive layer and the adhesive configuring the cell-side adhesive layer.

The method for manufacturing a battery module of the invention preferably includes one of the following (1) to (4), and more preferably includes a plurality of them.

(1) The different types of adhesives are a high viscosity adhesive, and a low viscosity adhesive with lower viscosity than the high viscosity adhesive.

(2) In the inserting step, one of the adhesives is applied to the inner circumferential surface of the battery retaining section, the other of the adhesives is applied to the outer circumferential surface of the battery cell, and the battery cell is then inserted into the battery retaining section.

(3) In the inserting step, the low viscosity adhesive is applied to the inner circumferential surface of the battery retaining section, and the high viscosity adhesive is applied to the outer circumferential surface of the battery cell.

(4) The high viscosity adhesive is applied thicker than the low viscosity adhesive.

A battery module of the invention that solves the above problem includes:

a holder including an aperture-shaped battery retaining section; a battery cell inserted into the battery retaining section; and an adhering layer that fixes an inner circumferential surface of the battery retaining section of the holder and an outer circumferential surface of the battery cell, wherein the adhering layer has a layer structure including a holder-side part making contact with the inner circumferential surface of the battery retaining section and a cell-side part making contact with the outer circumferential surface of the battery cell, and is provided between the inner circumferential surface of the battery retaining section and the outer circumferential surface of the battery cell on an entire circumference of the battery cell in a circumferential direction at least in a part of a region of the battery cell in an axial direction, and wherein the holder-side part and the cell-side part have different compositions.

The battery module of the invention preferably includes (5) as below, and more preferably includes (5) and (6).

(5) One of the cell-side part and the holder-side part covers the other thereof at one end side of the adhering layer in the axial direction.

(6) A thickness of a covering layer formed of one of the cell-side part and the holder-side part and covering the other thereof at the one end side of the adhering layer in the axial direction is formed thicker toward the one end side.

Advantageous Effects of Invention

According to the method for manufacturing the battery module of the invention, the adhesive can sufficiently be filled between the battery retaining section of the holder and the battery cell. Further, the battery module of the invention is a module in which the adhering layer made of adhesive is sufficiently filled between the battery retaining section of the holder and the battery cell.

BRIEF DESCRIPTION OF DRAWINGS

FIG. 1 A perspective diagram schematically showing a battery module of an example 1.

FIG. 2 A perspective disassembled diagram schematically showing the battery module of the example 1.

FIG. 3 A cross sectional diagram schematically showing a state in which the battery module of the example 1 is cut at X-X position in FIG. 1.

FIG. 4 An explanatory diagram schematically showing an inserting step in a manufacturing method of the example 1.

FIG. 5 A cross sectional diagram schematically showing a state in which a battery module of an example 2 is cut at the same position as the X-X position in FIG. 1.

FIG. 6 An explanatory diagram schematically showing an inserting step in a manufacturing method of the example 2.

DESCRIPTION OF EMBODIMENTS

Hereinbelow, a battery module and a method for manufacturing the same of the invention will be described with reference to specific examples. Hereinbelow, the method for manufacturing the battery module of the invention may simply be abbreviated as a manufacturing method of the invention as needed.

Example 1

FIG. 1 is a perspective diagram schematically showing a battery module of the example 1. FIG. 2 is a perspective disassembled diagram of the battery module of the example 1 shown in FIG. 1. FIG. 3 is a cross sectional diagram schematically showing a state in which the battery module of the example 1 is cut at X-X position in FIG. 1. FIG. 4 is an explanatory diagram schematically showing an inserting step in a manufacturing method of the example 1. Hereinbelow in the examples, upper, lower, left, right, front, and rear refer to upper, lower, left, right, front, and rear as shown in FIG. 1. In the examples, an axial direction Y of a battery cell refers to an upper and lower direction shown in FIG. 1. Notably, an axial direction Y of members other than the battery cell refers to a direction matching the axial direction Y in an assembled state shown in FIG. 1.

<Method for Manufacturing Battery Module>

A method of the example 1 for manufacturing a battery module is a method for manufacturing a battery module of the example 1. As will be described later, the battery module of the example 1 includes battery cells 1, an adhering layer 3, and a holder 5 (see FIG. 1 and FIG. 2). Each of the battery cells 1 is inserted into a battery retaining section 50 having a penetrating aperture shape provided in the holder 5. The adhering layer 3 is a layer formed by an adhesive to be described later being solidified, is provided between inner circumferential surfaces 51 of the battery retaining sections 50 and outer circumferential surfaces 11 of the battery cells 1, and fixes them. The method for manufacturing the battery module of the example 1 includes an inserting step and a cell fixing step.

(Inserting Step)

Firstly, different adhesives were applied to the outer circumferential surfaces 11 of the battery cells 1 and the inner circumferential surfaces 51 of the battery retaining sections 50. One of the adhesives had high viscosity compared to the other of the adhesives. The adhesive with the high viscosity will be termed a high viscosity adhesive, and the adhesive with the low viscosity will be termed a low viscosity adhesive.

As shown in a left-side portion of FIG. 4, at a part of a region in an axial direction Y in a battery cell 1, the high viscosity adhesive was applied on an entire circumference of the outer circumferential surface 11 of the battery cell 1. According to this operation, a cell-side adhesive layer 41 was formed on the outer circumferential surface 11 of the battery cell 1. Further, at a part of a region in the axial direction Y in a battery retaining section 50, the low viscosity adhesive was applied on an entire circumference of the inner circumferential surface 51 of the battery retaining section 50. According to this operation, a holder-side adhesive layer 45 was formed on the inner circumferential surface 51 of the battery retaining section 50.

An applied thickness of the high viscosity adhesive was 0.3 to 2.0 mm or the like. On the other hand, an applied thickness of the low viscosity adhesive was 0.05 to 0.3 mm or the like. Accordingly, the applied thickness of the high viscosity adhesive was thicker than the applied thickness of the low viscosity adhesive. The applied thickness of the high viscosity adhesive was greater than a distance between the outer circumferential surface 11 of the battery cell 1 and the inner circumferential surface 51 of the battery retaining section 50 in the battery module. Notably, the applied thickness of the low viscosity adhesive and the applied thickness of the high viscosity adhesive termed herein refer to average values of the respective applied thicknesses, and the distance between the outer circumferential surface 11 of the battery cell 1 and the inner circumferential surface 51 of the battery retaining section 50 refers to an average value of the aforesaid distances.

Next, the battery cells 1 including the cell-side adhesive layers 41 formed of the high viscosity adhesive were inserted into the battery retaining sections 50 including the holder-side adhesive layers 45 formed of the low viscosity adhesive. Specifically, as shown in a left-side portion of FIG. 4, the battery cells 1 were inserted into the battery retaining sections 50 by moving the battery cells 1 along the axial direction Y with respect to the fixed holder 5. At this occasion, the battery cells 1 moved from a lower side toward an upper side in FIG. 1 with respect to the holder 5.

As described above, the cell-side adhesive layers 41 are provided on the outer circumferential surfaces 11 of the battery cells 1, and the holder-side adhesive layers 45 are provided on the inner circumferential surfaces 51 of the battery retaining sections 50. Further, the thickness of the cell-side adhesive layers 41 (that is, the applied thickness of the high viscosity adhesive) is larger than the distance between the outer circumferential surfaces 11 of the battery cells 1 and the inner circumferential surfaces 51 of the battery retaining sections 50 in the battery module. In other words, in a stage prior to inserting the battery cells 1 into the battery retaining sections 50, the thickness of the cell-side adhesive layers 41 is greater than a thickness of spaces (called adhering spaces 20) defined by the inner circumferential surfaces 51 of the battery retaining sections 50 and the outer circumferential surfaces 11 of the battery cells 1, that is, a difference of an outer diameter and an inner diameter of the adhering spaces 20 forming a substantially cylindrical shape. Naturally, a sum of the thickness of the cell-side adhesive layers 41 and the thickness of the holder-side adhesive layers 45 is greater than the thickness of the adhering spaces 20 also. Due to this, as shown in a center portion of FIG. 4, the cell-side adhesive layer 41 and the holder-side adhesive layer 45 make pressure contact upon inserting the battery cell 1 into the battery retaining section 50. Viscosity of the cell-side adhesive layers 41 formed of the high viscosity adhesive is higher than viscosity of the holder-side adhesive layers 45 formed of the low viscosity adhesive, and the cell-side adhesive layers 41 are more unlikely to deform than the holder-side adhesive layers 45. Accordingly, at this occasion, the holder-side adhesive layers 45 deform significantly by being pressed by the cell-side adhesive layers 41, and are filled in the adhering spaces 20.

In other words, as shown in the center portion of FIG. 4, in inserting the battery cells 1 into the battery retaining sections 50, the cell-side adhesive layers 41 and the holder-side adhesive layers 45 make pressure contact, and the holder-side adhesive layer 45 with the low viscosity deforms with respect to the cell-side adhesive layer 41 with the high viscosity at a boundary interface of each cell-side adhesive layer 41 and holder-side adhesive layer 45. Due to this, the holder-side adhesive layers 45 function as a filler material to be filled between the inner circumferential surfaces 51 of the battery retaining sections 50 and surfaces of the cell-side adhesive layers 41 (namely, outer circumferential surfaces), and the cell-side adhesive layers 41 function as a pressing member for coating the holder-side adhesive layers 45. Further, the holder-side adhesive layers 45 function also as a lubricant for the cell-side adhesive layers 41, and the cell-side adhesive layers 41 function also as a filler material. Due to this, adhesive layers 4 formed of the cell-side adhesive layers 41 and the holder-side adhesive layers 45 are filled in the adhering spaces 20 provided between the battery retaining sections 50 and the battery cells 1 without any gap therein.

Basically, a deformation amount of each cell-side adhesive layer 41 becomes gradually larger from an insertion rear end side (lower side in FIG. 1) toward an insertion front end side (upper side in FIG. 1). This is because a portion on the insertion front end side of each cell-side adhesive layer 41 receives greater reaction force from the holder-side adhesive layer 45 compared to a portion on the insertion rear end side. This difference in the deformation amount of the cell-side adhesive layers 41 becomes prominent in cases with a smaller difference of viscosity between the cell-side adhesive layers 41 and the holder-side adhesive layers 45. On the other hand, if the difference of viscosity between the cell-side adhesive layer 41 and the holder-side adhesive layer 45 is large, the deformation amount of the cell-side adhesive layer 41 is small, whereby the thickness of the cell-side adhesive layer 41 becomes substantially constant from the insertion rear end side to the insertion front end. In the method for manufacturing the battery module of the example 1, the difference of viscosity between the cell-side adhesive layers 41 and the holder-side adhesive layers 45 is great. Due to this, the difference in the deformation amount as described above of the cell-side adhesive layers 41 is small, whereby the thickness of the cell-side adhesive layers 41 is substantially constant, and the thickness of the holder-side adhesive layers 45 is also substantially constant.

(Cell Fixing Step)

After the aforementioned inserting step, a complex of the battery cells 1, the holder 5, and the adhesive layers 4 formed by the battery cells 1 being inserted in the battery retaining sections 50, and the adhesive being filled in a part of the adhering spaces 20 in the axial direction is set still, and the battery module of the example 1 including the battery cells 1, the holder 5, and the adhering layers 3 are formed by causing state change of the fluid adhesive layers 4 into the solid adhering layers 3.

<Battery Module>

The battery module of the example 1 is obtained by the method for manufacturing a battery module of the example 1. As shown in FIG. 1 and FIG. 2, the battery module of the example 1 is composed of the battery cells 1, the adhering layers 3, the holder 5, separators 90, and bus bars 91.

The battery module of the example 1 includes 16 pieces of battery cells 1. Each battery cell 1 is a cylindrical cell of substantially the same shape, and has terminals 19 (positive terminal and negative terminal) respectively on both ends in the axial direction Y. The holder 5 has a substantially plate shape, and includes 16 pieces of battery retaining sections 50. Each battery retaining section 50 has a penetrating aperture shape, and the inner diameter of each battery retaining section 50 is somewhat larger than the outer diameter of each battery cell 1. A corresponding battery cell 1 is inserted into each battery retaining section 50. In the battery module of the example 1, each of the battery cells 1 is connected serially by two bus bars 91 by four of them configuring a set. Conductive material layers that are not shown are provided between the bus bars 91 and the battery cells 1. The conductive material layers are layers for electrically connecting the bus bars 91 and the terminals 19 of the battery cells 1. A shape of the conductive material layers is not specifically limited, and may be formed by a known method such as tab welding, wire bonding, brazing, or the like.

Separators 90 are provided locally between the bus bars 91 and the battery cells 1. The separators 90 are members for preventing short-circuiting by partially cutting off the electrical connection between the battery cells 1 and the bus bars 91 while the bus bars 91 are connecting the battery cells 1.

The separators 90 simply needs to be composed of an insulating material, and in the example, they are made of insulating resin material.

The adhering layers 3 are layers formed by solidification of the adhesive to be described later, are provided between the inner circumferential surfaces 51 of the battery retaining sections 50 provided on the holder 5, and the outer circumferential surfaces 11 of the battery cells 1, and are fixed to the inner circumferential surfaces 51 of the battery retaining sections 50 and the outer circumferential surfaces 11 of the battery cells 1. As shown in FIG. 3, each adhering layer 3 includes a holder-side part 35 and a cell-side part 31 formed of different types of adhesives, and has a two-layer structure in the example 1. The adhering layers 3 are provided in parts of regions in the axial direction Y (upper and lower direction in FIG. 1) of the battery cells 1. The regions of the battery cells 1 where the adhering layers 3 are provided will be termed fixing regions Z. Each adhering layer 3 is provided between the inner circumferential surface 51 of the battery retaining section 50 and the outer circumferential surface 11 of the battery cell 1 over the entire circumference in the circumferential direction of the battery cell 1 in the fixing region Z. Due to this, the adhering layer 3 forms a substantially cylindrical shape in the example 1 as shown in FIG. 2.

Each adhering layer 3 has the two-layer structure of the cell-side part 31 positioned on a radially inner side (inner circumferential side) and the holder-side part 35 positioned on a radially outer side (outer circumferential side). Each cell-side part 31 makes contact with the outer circumferential surface 11 of the battery cell 1 on an entire circumference of the battery cell 1 in the circumferential direction, in the fixing region Z. And each adhering layer 3 is fixed to the outer circumferential surface 11 of the battery cell 1. Each holder-side part 35 makes contact with the inner circumferential surface 51 of the battery retaining section 50 on an entire circumference of the battery cell 1 in the circumferential direction, in the fixing region Z. And each holder-side part 35 is fixed to the inner circumferential surface 51 of the battery retaining section 50. Further, the cell-side part 31 and the holder-side part 35 are fixed and integrated at their boundary interface. More specifically, each of the cell-side parts 31 and holder-side parts 35 forms a substantially cylindrical shape, and an inner circumferential surface of the cell-side part 31 makes contact with the outer circumferential surface 11 of the battery cell 1, an outer circumferential surface of the cell-side part 31 and an inner circumferential surface of the holder-side part 35 make contact with each other, and an outer circumferential surface of the holder-side part 35 makes contact with the inner circumferential surface 51 of the battery retaining section 50. That is, the adhering layers 3 are spread between the outer circumferential surfaces 11 of the battery cells 1 and the inner circumferential surfaces 51 of the battery retaining sections 50, in the fixing regions Z. And the adhering layers 3 are filled therein without gaps.

As described above, in the method for manufacturing the battery module of the example 1, the cell-side adhesive layers 41 to be the cell-side parts 31 are formed of the high viscosity adhesive, and the holder-side adhesive layers 45 to be the holder-side parts 35 are formed of the low viscosity adhesive. Due to this, in the battery module of the example 1, as shown in FIG. 3, each holder-side part 35 covers the cell-side part 31 at one end side of each adhering layer 3 in the axial direction Y (called the insertion front end side). Accordingly, in the battery module of the example 1, the holder-side parts 35 are the covering layer. Notably, the covering layer may in some cases be formed on the other end side of each adhering layer 3 in the axial direction Y (insertion rear end side).

The adhering layers 3 of the battery module of the example 1 are composed of two layers, namely of the layer-shaped holder-side parts 35 made of the low viscosity adhesive and the layer-shaped cell-side parts 31 made of the high viscosity adhesive. The thickness of each holder-side part 35 is substantially constant in a substantially entire region in the axial direction Y from its insertion rear end side to insertion front end side. Further, each holder-side part 35 covers a front end portion of the cell-side part 31 at a most front end portion on the insertion front end side. However, when an amount of the low viscosity adhesive is rather small, that is, when the layer thickness of the holder-side adhesive layers 45 and/or an axial length thereof is relatively small, front end portions of the cell-side part 31 may in some cases be exposed by not being covered by the holder-side parts 35. Further, the thickness of each cell-side part 31 is also substantially constant from its insertion rear end side to insertion front end side. Further, each cell-side part 31 covers a rear end portion of the holder-side part 35 at a rearmost end portion on the insertion rear end side. Within each holder-side part 35, a portion that is present at an inserting front end of the adhering layer 3 and that covers the front end portion of the cell-side part 31 will be called a front end-side covering portion 39a. Further, within each cell-side part 31, a portion that is present at an insertion rear end of the adhering layer 3 and that covers the rear end portion of the holder-side part 35 will be called a rear end-side covering portion 39b.

In the manufacturing method of the example 1, the adhesives were applied to each of the outer circumferential surfaces 11 of the battery cells 1 and the inner circumferential surfaces 51 of the battery retaining sections 50 to form the cell-side adhesive layers 41 and the holder-side adhesive layers 45, before inserting the battery cells 1 into the battery retaining sections 50. However, the cell-side adhesive layers 41 and the holder-side adhesive layers 45 just need to be formed in one of the stages in the inserting step, and are not limited to the method of the example. Further, in the manufacturing method of the example 1, the high viscosity adhesive was applied to the outer circumferential surfaces 11 of the battery cells 1 and the low viscosity adhesive was applied to the inner circumferential surfaces 51 of the battery retaining sections 50 by considering workability of applying-work. However, the low viscosity adhesive may be applied to the outer circumferential surfaces 11 of the battery cells 1 and the high viscosity adhesive may be applied to the inner circumferential surfaces 51 of the battery retaining sections 50. Further, in the example 1, two types of adhesives with different viscosity were used as the adhesive configuring the cell-side adhesive layers 41 and the adhesive configuring the holder-side adhesive layers 45. However, in the manufacturing method of the invention, just two different types of adhesives need to be used, and the viscosity of the adhesives is not specifically limited. For example, as in the example 2 to be described later, two types of adhesives with substantially the same viscosity and different compositions may be used. The two different types of adhesives referred herein are of a concept that includes "two types of adhesives with the main ingredients themselves configuring the adhesives being different". "two types of adhesives with the same material configuring the respective adhesives but with different composition ratios", "two-pack curing type adhesives with the same material and composition ratio but with different compounding ratios of curing agents". "two-pack curing type adhesives, one of which uses a main agent as the adhesive, and the other of which uses a curing agent as the adhesive", or the like.

Meanwhile, in the method for manufacturing the battery module of the invention, the types of the adhesives are not specifically limited. Accordingly, the adhesives just need to be selected suitably according to the required adhering strength, a use environment of the battery module, or the like. The adhesives of the invention refer to compositions capable of changing states thereof from fluid to solid, and capable of adhering at least onto the outer circumferential surfaces 11 of the battery cells 1 and the inner circumferential surfaces 51 of the battery retaining sections 50 upon changing the states from fluid to solid. For example, the adhesives just need to be in the fluid state in the inserting step, that is, at the time when the battery cells 1 are being inserted into the battery retaining sections 50. Further, in the cell fixing step, that is, after the battery cells 1 are inserted into the battery retaining sections 50, the state change from fluid to solid takes place by curing caused by chemical reaction, evaporation of a solvent or the like, and they just need to adhere onto the inner circumferential surfaces 51 of the battery retaining sections 50 and the outer circumferential surfaces 11 of the battery cells 1. The fluid state referred herein means a state of being flowable, and is of a concept including liquid, gel, sol, and slurry states.

As the adhesives, specifically reactive adhesives, solvent-based adhesives, emulsion-based adhesives, hot melting adhesives, synthetic rubber-based adhesives, or the like may be exemplified.

The reactive adhesives change their states into solids by chemical reaction or the like of the adhesives that were in the fluid state before the reaction. The reactive adhesives are categorized into a one-pack type and a two-pack type. A one-pack type of reactive adhesive chemically reacts by an external environment factor, and exhibits adhering (or fixing) function by solidifying. For example, epoxy-based one-pack type adhesive includes a curing agent. When the epoxy-based one-pack type adhesive is heated, curing reaction of the curing agent is started, and the adhesive solidifies. A silicon-based one-pack type adhesive reacts with moisture in the air. A UV curing one-pack type adhesive starts its reaction by ultraviolet ray being irradiated thereon. An anaerobic one-pack type adhesive starts its reaction when air is insulated.

The two-pack type of reactive adhesive solidifies when its fluid main agent and curing agent are mixed, and polymerization reaction and/or crosslinking reaction being generated. Monomers or oligomers is often used as the main agent generally. As a specific reactive adhesive, an epoxy resin-based adhesive, and a cyanoacrylate-based adhesive can be exemplified. As a reactable combination of the main agent and the curing agent, a combination of bisphenol A (BPA: as the main agent) and amine (as the curing agent) for the epoxy resin-based adhesive can be exemplified.

The solvent-based adhesive is an adhesive in which a polymer solid content that is a main component of the adhesive is dissolved in an organic solvent. As a specific example thereof, a chloroprene-based adhesive, a polyvinyl acetate solvent-based adhesive, or the like may be exemplified.

The emulsion-based adhesive is in a state of suspension in which polymer particles that are the main component of the adhesive are dispersed in a dispersion medium. As a specific example thereof, a vinyl acetate emulsion adhesive, a synthetic rubber latex adhesive, or the like may be exemplified.

The hot melting adhesive has thermoplastic polymers as its main component, is an adhesive that turns into fluid by heating and also changes its state from fluid to solid by cooling, and sometimes accompanies chemical reaction. As a specific example thereof, an ethylene vinyl acetate-based adhesive, a polyamide-based adhesive, or the like may be exemplified.

In the manufacturing method of the invention, two different types of adhesives are used as the adhesives. One of the adhesives will be called a first adhesive, and the other of the adhesives will be called a second adhesive. As these two types of adhesives, any combination may be used. For example, a combination of two types of adhesives suitably selected from the group consisting of the reactive adhesive, the solvent-based adhesive, the emulsion-based adhesive, and the hot melting adhesive as aforementioned may be used.

Further, for example, in the case of using the two-pack curing type reactive adhesives as the adhesives, the main agent may be selected as the first adhesive and a curing agent that reacts with the main agent may be selected as the second adhesive. In this case, the main agent and the curing agent are fluid as a whole before reaction and at an initial stage of reaction, and they solidify (or cure) by reacting with each other. Notably, in this case, since the reaction takes place at a contacting portion of the first adhesive and the second adhesive, adhesives that solidify by a reaction mechanism that progress in succession such as radical reaction or the like are preferably selected, so that the entireties of the first adhesive and the second adhesive react quickly. Specifically, acrylic resin-based adhesives or the like may be exemplified.

Further, as the first adhesive and the second adhesive, two types including both of the main agent and the curing agent can be used in combination. In this case, separate reactions occur respectively in the first adhesive and the second adhesive, however, the adhesives are the same in that the first adhesive and the second adhesive are in the fluid state at the initial stage of reaction, and the first adhesive and the second adhesive change their states to solids in a later stage of reaction.

Further, as the second adhesive, an adhesion adjuvant agent such as primer may be selected. The adhesion adjuvant agent generally forms a layer between the first adhesive and a counterpart member to which it was applied, that is, the outer circumferential surface 11 of the battery cell 1 or the inner circumferential surface 51 of the battery retaining section 50. Further, it modifies the outer circumferential surfaces 11 or the inner circumferential surfaces 51 by reacting with the outer circumferential surfaces 11 of the battery cells 1 or the inner circumferential surfaces 51 of the battery retaining sections 50. In case of selecting the adhesion adjuvant agent as the second adhesive, an adhesive including both the main agent and the curing agent can be selected as the first adhesive. A layer formed of the adhesion adjuvant agent (so-called a primer layer) is formed and thereby modified on each of the outer circumferential surfaces 11 of the battery cells 1 or the inner circumferential surfaces 51 of the battery retaining sections 50 to which the adhesion adjuvant agent was applied, and a layer formed of the first adhesive is fixed to this primer layer, whereby an adhering strength is improved. Further also in this case, the adhesives are the same in that the first adhesive and the second adhesive are in the fluid state at the initial stage of reaction, and the first adhesive and the second adhesive change their states to solids in the later stage of reaction.

Other than that, in case of selecting an adhesive including both the main agent and the curing agent as the first adhesive, the main agent may be selected as the second adhesive, or the curing agent may be selected as the second adhesive. In case of selecting an adhesive including both the main agent and the curing agent as the first adhesive and selecting the main agent as the second adhesive, the main agent of the second adhesive can react with the curing agent of the first adhesive, and it may be of the same main agent as the first adhesive, or may be different. Similarly, in case of selecting an adhesive including both the main agent and the curing agent as the first adhesive, and selecting the curing agent as the second adhesive, the curing agent of the second adhesive can react with the main agent of the first adhesive, and it may be of the same curing agent as the first adhesive, or may be different.

The viscosity of the adhesives can be adjusted by various types of methods. For example, the viscosity adjustment can be performed for example by suitably setting molecular weights of resin constituent components such as oligomers, polymers, or the like included in the adhesives. Generally, the resin constituent components with the low molecular weights are said to have low viscosity compared to the resin constituent components with the high molecular weights. Alternatively, the viscosity of the adhesives can be adjusted by blending various types of fillers to the adhesives.

Moreover, the adjustment of the viscosity of the adhesives can be performed by suitably setting the types and amounts of the fillers. Although being dependent on the types and particle diameters or the like of the fillers, in cases of using fillers with a small diameter, generally the viscosity of the adhesives is said to increase with greater blending amount of the fillers. If the adhesives are solvent-based adhesives or emulsion-based adhesives, the viscosity of the adhesives can be adjusted by suitably adjusting the blending ratios of the solvent and dispersion medium (that is, a solid concentration of the adhesives). The viscosity of the adhesive is increased with higher solid concentration. Further, the viscosity of the adhesives can be adjusted by suitably changing a mixing ratio of the main agent and the curing agent, or types of the main agent and/or the curing agent.

(Evaluation Test)

A degree of filling and an adhering strength by the adhesives were evaluated by using the aforementioned manufacturing method of the example 1, and changing the combinations of the first adhesive and the second adhesive. Results of Test 1 to Test 6 are shown in Table 1 described below.

(Test 1)

In Test 1, epoxy-based two-pack type reactive adhesives were used as the first adhesive and the second adhesive. As the first adhesive and the second adhesive, those including both the main agent and the curing agent were used respectively. Notably, the first adhesive and the second adhesive include the same type of epoxy resin as the main agent, and thus they are compatible. The viscosity of the first adhesive was 700 pascal seconds, and the viscosity of the second adhesive was 100 pascal seconds. The first adhesive being the high viscosity adhesive was applied to the outer circumferential surfaces 11 of the battery cells 1, and the second adhesive being the low viscosity adhesive was applied to the inner circumferential surfaces 51 of the battery retaining sections 50, and the battery cells 1 were inserted into the battery retaining sections 50 similar to the manufacturing method of the example 1. An inserting speed at this occasion was 30 mm/sec. Notably, the outer diameter of the battery cells 1 was 18 mm, the inner diameter of the battery retaining sections 50 was 18.4 mm, and the thickness of the adhering spaces 20 was 15 mm.

In the battery module obtained by the manufacturing method of Test 1, the adhering layers 3 were present without any gap on the entireties of the adhering spaces 20 (evaluation of filling: excellent). Further, the adhering strength of the adhering layers 3 in this battery module was evaluated by pulling out the battery cells 1 to one side in the axial direction while the holder 5 is in the fixed state. As a result, the adhering strength of the adhering layers 3 was sufficient as well. Specifically, the adhering strength of the adhering layers 3 was an equaling adhering strength as in the case where the first adhesive or the second adhesive was filled without any gap in the adhering spaces 20 (evaluation of adhering strength: excellent).

(Test 2)

A manufacturing method of Test 2 is the same as Test 1 except for a second adhesive.

In Test 2, the main agent included in the first adhesive was used as the second adhesive. The viscosity of the first adhesive was 700 pascal seconds similar to Test 1, and the viscosity of the second adhesive was 100 pascal seconds. Further, an inserting speed was 30 mm/sec, similar to Test 1.

In the battery module obtained by the manufacturing method of Test 2 also, the filling evaluation was excellent, and the evaluation of adhering strength was also excellent.

(Test 3)

A manufacturing method of Test 3 is the same as Test 1 except for a second adhesive.

In Test 3, an epoxy-based two-pack type reactive adhesive was used as the second adhesive. The viscosity of the second adhesive was 0.2 pascal seconds. The viscosity of the first adhesive was 700 pascal seconds similar to Tests 1 and 2. Further, the inserting speed was 30 mm/sec, similar to Tests 1 and 2.

In the battery module obtained by the manufacturing method of Test 3, the filling evaluation was ordinary, and the evaluation of adhering strength was also ordinary. Specifically, a gap was observed in a part of the adhering layers 3 in the battery module obtained by the manufacturing method of Test 3. Further, the adhering strength of the adhering layers 3 was less than 50% of the adhering strength in the case where the first adhesive or the second adhesive was filled without any gap in the adhering spaces 20.

(Test 4)

A manufacturing method of Test 4 is the same as Test 1 except for a second adhesive and an inserting speed.

In Test 4, an epoxy-based two-pack type reactive adhesive that is the same as that used in Test 3 was used as the second adhesive. That is, the viscosity of the first adhesive was 700 pascal seconds similar to Tests 1 to 3, and the viscosity of the second adhesive was 0.2 pascal seconds similar to Test 3. Further, the inserting speed was 0.5 mm/sec, which is slower than Tests 1 to 3.

In the battery module obtained by the manufacturing method of Test 4, the filling evaluation was excellent, and the evaluation of adhering strength was also excellent.

(Test 5)

A manufacturing method of Test 5 is the same as Test 1 except for a first adhesive.

In Test 5, an epoxy-based two-pack type reactive adhesive was used as the first adhesive. The second adhesive is the same as that used in Test 1. The viscosity of the first adhesive was 100 pascal seconds, and the viscosity of the second adhesive was 100 pascal seconds similar to Test 1. Further, an inserting speed was 30 mm/sec. similar to Tests 1 to 3.

In the battery module obtained by the manufacturing method of Test 5, the filling evaluation was excellent, and the evaluation of adhering strength was also excellent.

(Test 6)

A manufacturing method of Test 6 is the same as Test 1 except for a first adhesive and a second adhesive.

In Test 6, acrylic two-pack type reactive adhesives were used as the first adhesive and the second adhesive. The first adhesive is the main agent, and the second adhesive is the curing agent that reacts with the first adhesive being the main agent. The viscosity of the first adhesive was 30 pascal seconds, and the viscosity of the second adhesive was also 30 pascal seconds. Further, an inserting speed was 30 mm/sec, similar to Tests 1 to 3 and 5.

In the battery module obtained by the manufacturing method of Test 6, the filling evaluation was excellent, and the evaluation of adhering strength was also excellent.

TABLE 1

|  | First adhesive | | Second adhesive | | | | |
| --- | --- | --- | --- | --- | --- | --- | --- |
|  |  | Viscosity (Pascal seconds) |  | Viscosity (Pascal seconds) | Inserting speed (mm/s) | Filling evaluation | Adhering strength evaluation |
| Test 1 | A + B | 700 | A + B | 100 | 30 | Excellent | Excellent |
| Test 2 | A + B | 700 | A | 100 | 30 | Excellent | Excellent |
| Test 3 | A + B | 700 | A + B | 0.2 | 30 | Ordinary | Ordinary |
| Test 4 | A + B | 700 | A + B | 0.2 | 0.5 | Excellent | Excellent |
| Test 5 | A + B | 100 | A + B | 100 | 30 | Excellent | Excellent |
| Test 6 | A | 30 | B | 30 | 30 | Excellent | Excellent |

Note that "A" in Table 1 shows the main agents, and "B" in table 1 shows the curing agents.

From the results of Tests 1 to 6, it can be understood that the degree of filling is sufficient and sufficient adhering strength can be achieved both in case of using those with different viscosity as the two different types of adhesives and in case of using those with the same viscosity. Notably, in Test 3, the degree of filling and the adhering strength were lowered by using the second adhesive with a very low viscosity. This is assumed to be because the low viscosity second adhesive partially runs out in the axial direction by being pressed by the high viscosity first adhesive in the inserting step, whereby the two-layer structure of the first adhesive and the second adhesive is damaged. However, as shown in Test 4, the adhesive can be sufficiently filled in the adhering space by reducing inserting load by delaying the inserting speed, and sufficient adhering strength can be obtained. That is, in the method for manufacturing the battery module of the invention, the viscosity of the adhesives is not specifically limited, and it can be said that even those cases where the viscosity of the adhesives is expected to be too low can be handled by suitably setting the insertion load by adjusting the inserting speed in the inserting step or the like. As another method for adjusting the insertion load, it may be exemplified that the thickness of the adhering spaces 20 is made larger, or the like.

Example 2

FIG. 5 is a cross sectional diagram schematically showing a state in which a battery module of the example 2 is cut at the same position as the X-X position in FIG. 1. FIG. 6 is an explanatory diagram schematically showing an inserting step in a manufacturing method of the example 2.

<Method for Manufacturing Battery Module>
(Inserting Step)

Firstly, different adhesives were applied to outer circumferential surfaces 11 of battery cells 1 and inner circumferential surfaces 51 of battery retaining sections 50. In the manufacturing method of the example 2, viscosity of two adhesives was substantially the same. One of the adhesives will be called a first adhesive, and the other of the adhesives will be called a second adhesive. At a part of a region in an axial direction Y in a battery cell 1, the first adhesive was applied on an entire circumference of the outer circumferential surface 11 of the battery cell 1. According to this operation, a cell-side adhesive layer 41 was formed on the outer circumferential surface 11 of the battery cell 1. Further, at a part of a region in the axial direction Y in a battery retaining section 50, the second adhesive was applied on an entire circumference of the inner circumferential surface 51 of the battery retaining section 50. According to this operation, a holder-side adhesive layer 45 was formed on the inner circumferential surface 51 of the battery retaining section 50. Notably, a sum of an applied thickness of the first adhesive and an applied thickness of the second adhesive was larger than a thickness of adhering spaces 20.

Next, the battery cells 1 including the cell-side adhesive layers 41 formed of the first adhesive were inserted into the battery retaining sections 50 including the holder-side adhesive layers 45 formed of the second adhesive. According to this, at this occasion, as shown in a center portion of FIG. 6, the cell-side adhesive layer 41 and the holder-side adhesive layer 45 make pressure contact. In the manufacturing method of the example 2, the viscosity of the first adhesive and the second adhesive was substantially the same. That is, deformability of the cell-side adhesive layers 41 and the holder-side adhesive layers 45 was about the same degree. Accordingly, at this occasion, the holder-side adhesive layers 45 deform by being pressed by the cell-side adhesive layers 41, and the cell-side adhesive layers 41 deform by being pressed by the holder-side adhesive layers 45, whereby the holder-side adhesive layers 45 and the cell-side adhesive layers 41 are coat spread out by each other and are filled in the adhering spaces 20.

More specifically, a deformation amount of the cell-side adhesive layers 41 becomes gradually larger from an insertion rear end side toward an insertion front end side. Further, this difference in the deformation amount of the cell-side adhesive layers 41 becomes prominent in cases with a smaller difference of viscosity between the cell-side adhesive layers 41 and the holder-side adhesive layers 45. In the example 2, the viscosity of both adhesives is substantially the same, and there scarcely is any viscosity difference. Accordingly, the cell-side adhesive layers 41 have a taper shape of which thickness gradually decreases from the insertion rear end side toward the insertion front end side, and cell-side parts 31 formed by the solidification of the cell-side adhesive layers 41 also have the taper shape of which thickness gradually decreases from the insertion rear end side toward the insertion front end side. Further, the holder-side adhesive layers 45 are pressed by the cell-side adhesive layers 41 and are filled between surfaces (outer circumferential surfaces) of the cell-side adhesive layers 41 and inner circumferential surfaces 51 of the battery retaining sections 50. Due to this, the holder-side adhesive layers 45 have a substantially complementary shape relative to the cell-side adhesive layers 41, that is, a taper shape of which thickness gradually decreases from the insertion front end side toward the insertion rear end side. Similarly, the holder-side parts 35 have a taper shape of which thickness gradually decreases from the insertion front end side toward the insertion rear end side.

Further in other words, as shown in a center portion of FIG. 6, in inserting the battery cells 1 into the battery retaining sections 50, the cell-side adhesive layers 41 and the holder-side adhesive layers 45 make pressure contact, and deform at the same degree while slipping against each other at a boundary interface thereof. Due to this, the holder-side adhesive layers 45 function as a filler material to be filled between the inner circumferential surfaces 51 of the battery retaining sections 50 and surfaces (outer circumferential surfaces) of the cell-side adhesive layers 41, and the cell-side adhesive layers 41 function as a pressing member for coating the holder-side adhesive layers 45. On the other hand, the cell-side adhesive layers 41 function also as a filler material to be filled between the outer circumferential surfaces 11 of the battery cell 1 and surfaces (inner circumferential surfaces) of the holder-side adhesive layers 45, and the holder-side adhesive layers 45 function as a pressing member for coating the cell-side adhesive layers 41. Further, the holder-side adhesive layers 45 function also as a lubricant for the cell-side adhesive layers 41, and the cell-side adhesive layers 41 function also as a lubricant for the holder-side adhesive layers 45.

Due to this, in the manufacturing method of the example 2 also, adhesive layers 4 formed of the cell-side adhesive layers 41 and the holder-side adhesive layers 45 are filled in the adhering spaces 20 provided between the battery retaining sections 50 and the battery cells 1 without any gap therein.

<Battery Module>

The battery module of the example 2 is obtained by the method for manufacturing a battery module of the example 2. The battery module of the example 2 is the same as the battery module of the example 1 except for that the viscosity of the two adhesive layers 41, 45 of the adhering layers 3 is substantially the same. As shown in FIG. 5, the adhering layers 3 in the battery module of the example 2 has a two-layer structure including the holder-side parts 35 and the cell-side parts 31, similar to the adhering layers 3 in the battery module of the example 1. The adhering layers 3 are provided in parts of regions in the axial direction Y of the battery cells 1, that is, in fixing regions Z. Each adhering layer 3 is provided between the inner circumferential surface 51 of the battery retaining section 50 and the outer circumferential surface 11 of the battery cell 1 over the entire circumference in the circumferential direction of the battery cell 1 in the fixing region Z. Each adhering layer 3 has the two-layer structure of the cell-side part 31 and the holder-side part 35. Each cell-side part 31 makes contact with the outer circumferential surface 11 of the battery cell 1 on an entire circumference of the battery cell 1 in the circumferential direction, in the fixing region Z. And each cell-side part 31 is fixed to the outer circumferential surface 11, similar to the example 1. Each holder-side part 35 also makes contact with the inner circumferential surface 51 of the battery retaining section 50 on an entire circumference of the battery cell 1 in the circumferential direction, in the fixing region Z. And each holder-side part 35 is fixed to the inner circumferential surface 51, similar to the example 1. Further, the cell-side part 31 and the holder-side part 35 are fixed and integrated at their boundary interface. The boundary interface in cell-side part 31, being the outer circumferential surface of the cell-side part 31, and the boundary interface in the holder-side part 35, being the inner circumferential surface of the holder-side part 35 form inclined surface shapes that are complementary relative to each other. The adhering layers 3 are filled in adhering regions in the fixing regions Z without any gap. The thickness of the cell-side parts 31 and the thickness of the holder-side parts 35 are substantially the same.

As shown in FIG. 5, the holder-side parts 35 cover the cell-side parts 31 on the insertion front end side of the adhering layers 3 in the axial direction Y. Accordingly, in the battery module of the example 2, the holder-side parts 35 are the covering layer. Further, on the insertion rear end side of the adhering layers 3, the cell-side parts 31 cover the holder-side parts 35. Accordingly, in the battery module of the example 2, the cell-side parts 31 are also the covering layer.

INDUSTRIAL APPLICABILITY

Purposes of use of the battery module of the invention is not specifically limited, and it can be installed in various devices and equipment. As a specific example, a battery pack to be installed in a vehicle can be exemplified.

REFERENCE SIGNS LIST

1: Battery cells, 11: Outer Circumferential Surface of Battery Cell, Y: Axial Direction of Battery Cell
3: Adhering layer, 31: Cell-side Part, 35: Holder-side Part
4: Adhesive layer, 41: Cell-side Adhesive layer, 45: Holder-side Adhesive layer
5: Holder, 50: Battery Retaining Section, 51: Inner Circumferential Surface of Battery Retaining Section

The invention claimed is:

1. A method for manufacturing a battery module, the method comprising:
    applying a holder-side adhesive to an inner circumferential surface of a battery retaining section of a holder having an aperture-shaped battery retaining section and forming a layer of the holder-side adhesive on the inner circumferential surface of the battery retaining section, and applying a cell-side adhesive to an outer circumferential surface of the battery cell and forming a layer of the cell-side adhesive on the outer circumferential surface of the battery cell, the holder-side adhesive and the cell-side adhesive each having a fluid state and a solid state, and
    an inserting step of inserting the battery cell in the battery retaining section while the holder-side adhesive and the cell-side adhesive are in the fluid state and contacting the layer of the holder-side adhesive layer on the inner circumferential surface of the battery retaining section with the layer of the cell-side adhesive on the outer circumferential surface of the battery cell, which results in the holder-side adhesive layer and the cell-side adhesive layer facing each other between the inner circumferential surface of the battery retaining section and the outer circumferential surface of the battery cell extending on an entire circumference of the battery cell in a circumferential direction and extending at least in a part of a region of the battery cell in an axial direction, and a cell fixing step of fixing the inner circumferential surface of the battery retaining section and the outer circumferential surface of the battery cell together by solidifying the holder-side adhesive layer and the cell-side adhesive layer, wherein the holder-side adhesive layer and the cell-side adhesive layer each consist of an adhesive composition different from one another, and the holder-side adhesive layer and the cell-side adhesive layer are configured respectively with a viscosity and a thickness so that the viscosities and thicknesses of the holder-side adhesive layer and the cell-side adhesive layer cooperate with one another during the inserting step to fill spaces between the battery retaining sections and the battery cells without any gap therebetween, thereby resulting in an improved adhering strength between the holder-side adhesive layer and the cell-side adhesive layer.

2. The method for manufacturing a battery module according to claim 1, wherein one of the holder-side adhesive and the cell-side adhesive is a high viscosity adhesive, and another of the holder-side adhesive and the cell-side adhesive is a low viscosity adhesive with lower viscosity than the high viscosity adhesive.

3. The method for manufacturing a battery module according to claim 2, wherein in the inserting step, the holder-side adhesive is the low viscosity adhesive and the cell-side adhesive is the high viscosity adhesive.

4. The method for manufacturing a battery module according to claim 3, wherein the high viscosity adhesive is applied to the outer circumference surface of the battery cell so that the cell-side adhesive layer has a thickness greater than a thickness of the holder-side adhesive layer comprising the low viscosity adhesive.

5. The battery module according to claim 1, wherein in the inserting step, the holder-side adhesive layer and the cell-side adhesive layer are configured to have complementary tapering shapes relative to the axial direction, the holder-side adhesive layer having a thickness that gradually increases toward one end of the battery cell and the cell-side adhesive layer having a thickness that gradually increases toward another end of the battery cell.

6. The battery module according to claim 1, wherein the holder-side adhesive layer and the cell-side adhesive layer have substantially identical viscosities, and in the inserting step, the holder-side adhesive layer and the cell-side adhesive layer of the adhering layer are configured to have a gradually increasing thickness in the axial direction and a gradually decreasing thickness in the axial direction, respectively.

7. The battery module according to claim 1, wherein the cell-side adhesive part on the outer circumference surface of the battery has thicker than a thickness greater than a thickness of the holder-side adhesive part on the inner circumferential surface of the battery retaining section.

8. A battery module comprising:

a holder including an aperture-shaped battery retaining section;

a battery cell inserted into the battery retaining section;

and an adhering layer that fixes an inner circumferential surface of the battery retaining section of the holder and an outer circumferential surface of the battery cell, wherein the adhering layer has a layered structure including a holder-side adhesive part contacting the inner circumferential surface of the battery retaining section and a cell-side adhesive part contacting the outer circumferential surface of the battery cell, and the adhering layer is provided between the inner circumferential surface of the battery retaining section and the outer circumferential surface of the battery cell and the adhering layer extends on an entire circumference of the battery cell in a circumferential direction and extends at least in a part of a region of the battery cell in an axial direction, and wherein the holder-side adhesive part and the cell-side adhesive part each consist of an adhesive composition different from one another, and each of the holder-side adhesive part and the cell-side adhesive part have a thickness configured to cooperate with one another to improve adhering strength between the holder-side adhesive part and the cell-side adhesive part.

9. The battery module according to claim 8, wherein one of the cell-side adhesive part and the holder-side adhesive part covers another of the holder-side adhesive and the cell-side adhesive at one end side of the adhering layer in the axial direction.

10. The battery module according to claim 9, wherein a covering layer of the one of the cell-side adhesive part and the holder-side adhesive part that covers the other of the holder-side adhesive and the cell-side adhesive at the one end side of the adhering layer in the axial direction has a thickness greater than a thickness of the other of the holder-side adhesive and the cell-side adhesive at the one end side.

11. The battery module according to claim 8, wherein the holder-side adhesive part and the cell-side adhesive part have complementary tapering shapes relative to the axial direction, the holder-side adhesive part having a thickness that gradually increases toward one end of the battery cell and the cell-side adhesive part having a thickness that gradually increases toward another end of the battery cell.

12. The battery module according to claim 8, wherein the holder-side adhesive part and the cell-side adhesive part of the adhering layer have substantially identical viscosities, and the holder-side adhesive part and the cell-side adhesive part of the adhering layer have a gradually increasing thickness in the axial direction and a gradually decreasing thickness in the axial direction, respectively.

* * * * *